US012437462B2

(12) United States Patent
Hakura et al.

(10) Patent No.: US 12,437,462 B2
(45) Date of Patent: Oct. 7, 2025

(54) HEURISTICS ENABLED TILED RENDERING

(71) Applicant: NVIDIA Corporation, Santa Clara, CA (US)

(72) Inventors: Ziyad Hakura, San Jose, CA (US); Sriram Venkateshan, Bangalore (IN); Sharad Raj, Bengaluru (IN)

(73) Assignee: NVIDIA Corporation, Santa Clara, CA (US)

( * ) Notice: Subject to any disclaimer, the term of this patent is extended or adjusted under 35 U.S.C. 154(b) by 545 days.

(21) Appl. No.: 17/740,169

(22) Filed: May 9, 2022

(65) Prior Publication Data

US 2023/0360305 A1  Nov. 9, 2023

(51) Int. Cl.
*G06T 15/00* (2011.01)
*G06T 1/20* (2006.01)

(52) U.S. Cl.
CPC .............. *G06T 15/005* (2013.01); *G06T 1/20* (2013.01)

(58) Field of Classification Search
CPC ................................ G06T 15/005; G06T 1/20
See application file for complete search history.

(56) References Cited

U.S. PATENT DOCUMENTS

| | | | | |
|---|---|---|---|---|
| 10,262,459 | B1* | 4/2019 | Baldwin | G06T 17/10 |
| 2004/0196283 | A1* | 10/2004 | Lewis | G06T 15/10 |
| | | | | 345/419 |
| 2007/0165035 | A1* | 7/2007 | Duluk | G06T 15/20 |
| | | | | 345/506 |
| 2007/0296725 | A1* | 12/2007 | Steiner | G06T 15/005 |
| | | | | 345/505 |
| 2014/0118376 | A1* | 5/2014 | Hakura | G09G 5/395 |
| | | | | 345/545 |
| 2014/0139534 | A1* | 5/2014 | Tapply | G06T 11/40 |
| | | | | 345/522 |
| 2020/0402298 | A1* | 12/2020 | Lauritzen | G06T 15/80 |
| 2022/0058852 | A1* | 2/2022 | Surti | G06T 1/60 |

* cited by examiner

*Primary Examiner* — Terrell M Robinson
(74) *Attorney, Agent, or Firm* — Lowenstein Sandler LLP

(57) ABSTRACT

In embodiments a graphics pipeline includes a logic that can assess whether to enable or disable tiled rendering for sets of graphics primitives. The logic applies one or more rules or heuristics to a set of graphics primitives associated with a frame, and determines whether to enable tiled rendering for that set of graphics primitives if the one or more rules or heuristics are satisfied. Otherwise, the logic determines to disable tiled rendering for that set of graphics primitives. As further graphics primitives are received for the frame, the logic may make additional decisions as to whether or not to render the further graphics primitives using tiled rendering.

24 Claims, 7 Drawing Sheets

HEURISTICS ENABLED TILED RENDERING

TECHNICAL FIELD

According to various novel techniques described herein, at least one embodiment pertains to rendering, and in particular to tiled rendering. For example, enabling and/or disabling tiled rendering based on heuristics is performed according to various novel techniques described herein.

BACKGROUND

Typically, three-dimensional (3D) scenes provide an immersive experience with the illusion of depth. Creating 3D scenes requires that each 3D object of the 3D scene be loaded into memory. Each 3D object is transformed into graphics primitives (e.g., points, lines, and/or triangles) that approximate the 3D object. The 3D scene is produced by transforming the graphics primitives to the two-dimensional (2D) plane and then performing per-fragment computation, which may include performing texture lookups to produce realism. After rendering, the rendered graphics primitives produce an image in a frame buffer to be displayed.

Rendering is generally performed one primitive at a time, without taking into account a size of the primitives or where the primitives are located in a scene. Tiled rendering is a type of rendering process that subdivides an image into a grid in image space and renders each section of the grid (referred to as a tile) separately.

Conventional systems have a configuration setting for rendering images using standard rendering or tiled rendering, and that configuration setting applies for all images that are rendered. This leads to inefficiencies.

DETAILED DESCRIPTION

Figure 1:
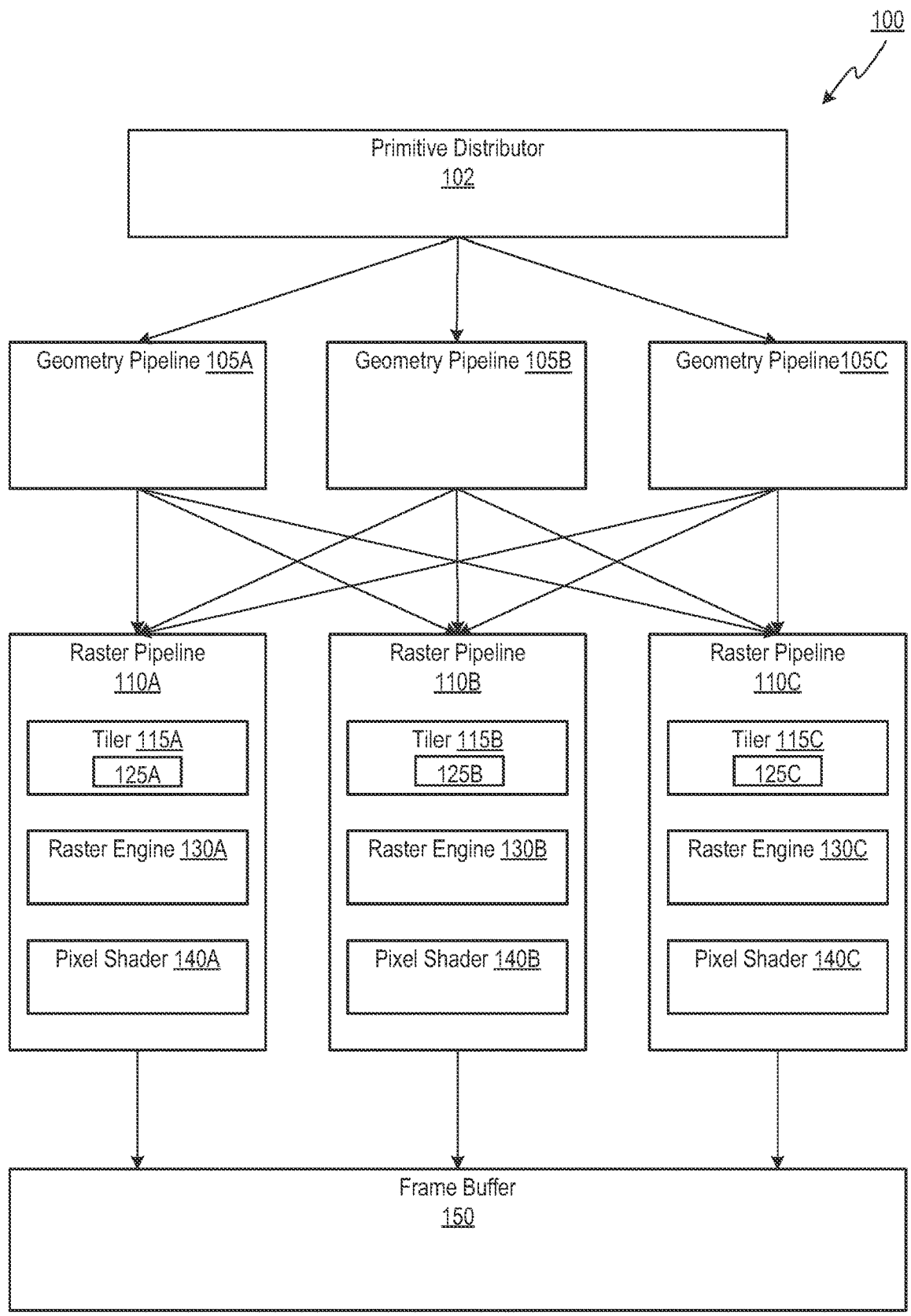
FIG. 1 is a diagram of a graphics engine, in accordance with at least one embodiment.

Embodiments described herein relate to graphics rendering techniques, and in particular to techniques for dynamically updating how rendering is performed for different portions of an image/frame and/or for different frames. Embodiments include techniques for enabling and/or disabling tiled rendering based on one or more criteria, rules and/or heuristics. Accordingly, different graphics primitives that make up a single image or frame may be rendered using different rendering techniques. Some of the primitives may be rendered using tiled rendering, while other primitives may be rendered using standard rendering. Additionally, the graphics primitives from different frames may be rendered using different rendering techniques. Primitives from a first frame may be rendered using a different technique than primitives from a second frame, for example.

In one embodiment, the method, system, and apparatuses that perform rendering of image data as described herein may receive a set of graphics primitives (e.g., triangles) associated with a frame (e.g., of a three-dimensional scene). The graphics primitives may constitute a fraction of the graphics primitives that make up an image, and may be the amount of graphics primitives that fit in a buffer in some embodiments. Processing logic may determine a size value based on the graphics primitives under consideration (e.g., the graphics primitives in the buffer). Processing logic may determine whether the size value satisfies one or more criteria, and determine whether to use standard rendering or tiled rendering to render the graphics primitives in the buffer based on whether the size value satisfies the one or more criteria. In an example, the size value may be compared with a size threshold to determine whether the size value is below, meets, or exceeds the size threshold. Tiled rendering for the graphics primitives may be enabled or disabled based on whether or not the size value meets the size threshold. Once the graphics primitives in the set are processed, a new set of graphics primitives associated with the same frame as the previous set of primitives may be received. A determination may again be made for the new set of graphics primitives as to whether or not a size value associated with the new set of graphics primitives satisfy the one or more criteria, and a determination may be made as to whether to render the new set of graphics primitives using standard rendering or tiled rendering. The second set of graphics primitives may be rendered using the same technique or a different technique than the first set of graphics primitives, as appropriate. This process may continue until all graphics primitives for the frame have been processed, after which the process repeats for the graphics primitives of a next frame.

The size value that is determined for a set of graphics primitives may be determined by computing an approximate average area for the set of graphics primitives. The approximate average area may be determined by determining respective approximate areas associated with each of the plurality of graphics primitives and averaging the plurality of approximate areas. In one embodiment, the approximate area for a graphics primitive is determined based on a number of tiles that fall within a bounding box that encompasses the graphics primitive. In embodiments, a size threshold may be determined by determining a tile size and multiplying the tile size with a configurable threshold value. In one embodiment, responsive to determining that a size value for a set of graphics primitives exceeds the size threshold, tiled rendering of the set of graphics primitives is be performed. In one embodiment, responsive to determining that the size value for a set of graphics primitives is below the size threshold, standard rendering of the set of graphics primitives is performed.

Standard rendering is a more efficient rendering technique for some graphics primitives, while tiled rendering is a more efficient rendering technique for other graphics primitives. Standard rendering refers to rendering the primitives in the order they are received regardless of where they lie on the image. Tiled rendering takes advantage of locality in graphics rendering (e.g., 3D graphics rendering) with the goal of reducing memory bandwidth usage (e.g., of dynamic random access memory (DRAM)). Tiled rendering works by breaking up a frame into tiles in screen or image space, and attempting to render those graphics primitives that belong to a same tile before rendering those graphic primitives that belong to other tiles. In some instances, tiled rendering can provide improved performance by reducing memory bandwidth usage. However, while tiled rendering can increase performance in some instances, it can also impair performance in other instances. In some instances, tiled rendering imposes an increased overhead associated with traversing multiple tiles and buffering primitives in a bin for tiled rendering. For example, tiled rendering may be more efficient than standard rendering for a set of primitives that has a first average size (e.g., a size that exceeds a size threshold), and may be less efficient than standard rendering for a set of primitives that has a second average size (e.g., a size that is below the size threshold).

Embodiments apply a logic to analyze sets of primitives for a frame or image before they are rendered and independently determine how to render each of the sets of primitives according to properties (e.g., such as an average size) of the respective sets of primitives. Thus, in embodiments a logic determines when standard rendering is more efficient and applies standard rendering in such cases, and determines when tiled rendering is more efficient and applies tiled rendering in such cases. Embodiments, enable an on-the-fly determination of what rendering technique to use, and then application of such a determined rendering technique. As a result, a most efficient rendering technique can be used based on the contents of what is being rendered at any given time. Large primitives tend to benefit from tiled rendering, and for those primitives, processing logic may enable tiled rendering. Small primitives tend to benefit less or not at all from tiled rendering and for those primitives processing logic may disable tiled rendering and send them through a raster pipeline without tiling, and its associated overheads.

In embodiments, a hardware component (e.g., a component of a graphical processing unit (GPU) in an image processing pipeline makes determinations of what rendering technique to apply as graphics primitives are received and before they are rendered. The hardware component can reduce or remove a burden on a driver for the GPU of determining whether or not to use standard rendering or tiled rendering. The hardware component may include one or more rules or heuristics that it can apply to sets of primitives (e.g., those primitives that fill a buffer or memory). The hardware component may have a greater insight into properties of the graphics primitives to be rendered, and may take advantage of that insight to implement a granular control of how the graphics primitives are rendered. In particular, the hardware component may make informed decisions as to whether to implement tiled rendering or standard rendering for individual primitives, set of primitives and/or frames. In an example, the driver may not have information on the size of triangles to be drawn to a screen that is in a draw call, whereas the hardware component in the graphics processing pipeline can tell exactly how large each of the primitives is after vertex processing has been performed. This enables the hardware component to make decisions to enable or disable tiled rendering at a significantly finer granularity of work compared with the draw call granularity of a driver.

FIG. 1 illustrates a system for enabling and/or disabling tiled rendering based on heuristics and/or rules applied to the graphics primitives associated with a frame or image in accordance with some embodiments of the present disclosure, shown generally as graphics pipeline 100 (e.g., of a graphics engine). The graphics engine may be or include a GPU and/or other hardware associated with graphics pipeline 100. The graphics pipeline 100 may be implemented by one or more hardware, firmware and/or software components, and in at least one embodiment includes a primitive distributor 102, one or more geometry pipelines 105A-C, one or more raster pipelines 110A-C, and a frame buffer 150. The graphics pipeline 100 may also include many other components, standard to graphics engines, which are not shown herein for the sake of clarity.

In computer graphics, a graphics pipeline (also referred to as a rendering pipeline) is a conceptual model that describes what steps a graphics system (e.g., including a GPU, driver, software and/or graphics hardware accelerator) performs to render a scene (e.g., a 3D scene) to a display (e.g., to a 2D display). Once a model such as a 3D model has been created (e.g., by a video game or 3D computer animation software), the graphics pipeline converts that model into an output to a display. Steps of the pipeline may be implemented in hardware, firmware, and/or software. Implementation of steps of the pipeline in hardware allows for many optimizations.

A graphics pipeline conceptually includes an application phase, a geometry phase and a rasterization phase. The application phase is generally implemented in software by a processor (e.g., central processing unit (CPU) executing an application), and includes determining a scene (e.g., based on user interaction with the application). The scene includes graphics primitives, which may include points, lines and/or triangles.

The geometry phase of the graphics pipeline includes performing one or more operations with polygons and their vertices. Such operations may include performing a first transformation from individual coordinate systems of different objects in the scene to a global coordinate system, and performing a second transformation to project the scene from the global coordinate system to a camera coordinate system of a virtual camera viewing the scene. Such operations may further include performing a third transformation to project the scene from the 3D camera coordinate system to a plane associated with the camera coordinate system.

The geometry phase of the graphics pipeline may further include adding lighting effects to a scene, and performing clipping to remove primitives that are outside of a field of view (e.g., outside of the borders of the display).

In one embodiment, the primitive distributor 102 can receive all graphics primitives (e.g., geometry) in 3D space (having x, y, and z coordinates) of a 3D scene obtained from an application. The primitive distributor 102 may additionally or alternatively receive all graphics primitives in a 2D image space of a 2D scene. The primitive distributor 102 may distribute all the primitives in 3D space to the plurality of geometry pipelines 105A-C of the graphics pipeline 100. In some embodiments, the primitive distributor 102 may distribute all the primitives in 3D space to one of the plurality of geometry pipelines 105A-C, a subset of the plurality of geometry pipelines 105A-C, or all of the geometry pipelines of the plurality of geometry pipelines 105A-C.

Geometry pipelines 105A-C may perform a geometry phase of graphics pipeline. In one embodiment, the geometry pipelines perform one or more of a transformation or conversion from individual object reference frames to a global reference frame, a transformation or conversions from a 3D global reference frame to a 3D camera reference frame, and/or a transformation or conversion from a 3D camera reference frame to a 2D plane.

Each converter of the plurality of geometry pipelines 105A-C may convert in 3D space to primitives in 2D image space, based on a camera position in the 3D space. This may include projecting primitives from 3D space onto a plane, where the plane has a position/orientation associated with a camera position of a virtual camera from which the scene is to be viewed. The primitives in 2D image space represent how the primitives in 3D space appear in 2D screen space associated with the camera position. Accordingly, primitives may be converted from 3D values (e.g., having x, y and z components) to 2D values (e.g., having x and y components).

Each converter of the plurality of geometry pipelines 105A-C may distribute the primitives in 2D image space to one or more of the raster pipelines 110A-C. The raster pipelines 110A-C may perform a rasterization phase of the graphics pipeline 100 in an embodiment. In some embodiments, each raster pipeline 110A-C is responsible for rendering a portion of the 2D screen space. Accordingly, each converter of the plurality of geometry pipelines 105A-C may distribute all the primitives in 2D image space to one of the raster pipelines 110A-C, a subset of the raster pipelines 110A-C, or all of the raster pipelines 110A-C.

In one embodiment, each raster pipeline 110A-C includes a tiler (e.g., tiler 115A), a raster engine (e.g., raster engine 130A), and a pixel shader (e.g., pixel shader 140A). The respective raster pipeline 110A-C may send the primitives in 2D image space to a tiler 115A-C. The tiler 115A-C stores the primitives in 2D image space to a bin or memory (not shown) in the tiler 115A-C. Once the bin or memory is full, the tiler 115A-C determines whether to enable or disable tiling (e.g., tiled rendering) for the primitives in the bin or memory. Tiler 115A-C determines how to render the primitives in the bin or memory based on one or more rules or heuristics in embodiments. For example, if the primitives satisfy criteria for tiled rendering, then tiler 115A-C may determine to render the primitives in the bin or memory using tiled rendering. If the primitives fail to satisfy the criteria for tiled rendering, then tiler 115A-C may determine not to render the primitives in the bin or memory using tiled rendering (e.g., may determine to render the primitives using standard rendering).

The tiler 115A-C may include a rendering decision component 125A-C that can make the decision of whether to enable or disable tiled rendering. Such a decision can be made on a frame-by-frame basis or on a bin-by-bin basis (e.g., based on the set graphics primitives (associated with a frame of the 3D scene that currently fills a bin or memory). Such a decision can be made based on one or more criteria, which may include one or more rules or heuristics of the rendering decision component 125A-C. Such rules or heuristics may be based on sizes of stored primitives in embodiments. In other embodiments, rules or heuristics that dictate when to enable and disable tiled rendering may be based on other properties of primitives, such as how many tiles primitives span, in addition to or instead of on the sizes of primitives. In one embodiment, the rendering decision component 125A-C, based on the primitives in 2D image space stored in the bin (not shown) of the tiler 115A-C, determines whether to enable or disable tiling by comparing a size value of the primitives in 2D image space with a size threshold. In embodiments, each tiler 115A-C has its own bin or memory, and makes its own decision as to how to render those primitives in that respective tiler's bin or memory. Thus, at any given time some tilers 115A-C may render primitives using tiled rendering while other tilers render different primitives using standard rendering. As new sets of primitives are received, each tiler 115A-C may again make a new decision as to how to render the new set of primitives received by that tiler. Accordingly, each tiler may render different primitives for a single frame using the same or different rendering techniques, as appropriate.

In embodiments, tiler(s) 115A-C and rendering decision component(s) 125A-C are hardware modules that are integrated into a GPU or graphics accelerator. Implementation of the rendering decision component(s) 125A-C in hardware can improve an efficiency of graphics pipeline 100 as compared to traditional graphics pipelines by enabling rendering decisions of how to render primitives to be made on-the-fly during a rendering process, at a finer degree of granularity than previously possible.

The rendering decision component 125A-C may determine the size value of the primitives in 2D image space in the bin or memory of the tiler 115A-C by obtaining an approximate average area of the primitives in 2D image space. The rendering decision component 125A-C may determine the approximate average area of the primitives in 2D image space by determining an approximate area of each primitive and averaging all the approximate areas associated with all the primitives in 2D image space. Depending on the embodiment, when the rendering decision component 125A-C determines the approximate area of a respective set of the primitives in 2D image space stored in a bin or memory associated with the tiler 115A-C, the rendering decision component 125A-C may divide the set of primitives into groups, and determine an approximate area for each group. In embodiments, the rendering decision component 125 may multiply the approximate area of a group of primitives by a number of primitives present in the group. Depending on the embodiment, the rendering decision component 125A-C may determine the precise average area of the primitives in 2D image space rather than the approximate average area of the primitives in 2D image space.

The rendering decision component 125A-C may compare the average tile size to a size threshold. The size threshold may be based at least in part on a tile size. In one embodiment, the size threshold is determined by multiplying a tile size with a configurable threshold value. In particular, the tiler 115A-C may obtain the tile size (e.g., a predetermined tile size) used to subdivide the 2D image space into a grid of tiles, and may multiply this value by a threshold value. Adjusting the threshold value may adjust the prevalence of tiled rendering vs. standard rendering performed by the tiler 115A-C. The configurable threshold may refer to a multiplier to apply to a tile size in which to compare the approximate average area of the primitives in 2D image space and determine whether to enable or disable tiling.

Responsive to determining that the size value of the primitives in 2D image space exceeds the size threshold, the rendering decision component 125A-C may enable tiling in the tiler 115A-C. The tiler 115A-C, based on tiling being enabled, sorts the primitives in 2D image space by tiles and provides the primitives in 2D image space to a next component in the graphics pipeline 100 (e.g., raster engine 130A-C), tile by tile. Accordingly, all of the primitives in one tile are processed and sent to a next component prior to primitives in a next tile are processed.

Accordingly, depending on the embodiment, each raster pipeline 110A-C may receive a predetermined number of primitives in 2D image space that can be contained in the bin or memory of the tiler 115A-C (e.g., that fills the bin or memory). If tiling is enabled, the tiler 115A-C subdivides the 2D image space into a grid of tiles (e.g., rectangles) based on a predetermined tile size used to render each tile of the grid separately (e.g., each tile corresponds to a grid position of the 2D image space).

In one embodiment, providing the primitives in 2D image space to the next component of the graphics pipeline 100 (e.g., to the frame buffer 150), tile by tile, includes providing the primitives associated with a particular tile to the raster engine 130A-C and/or pixel shader 140A-C before sending primitives in a next tile to the raster engine 130A-C and/or pixel shader 140A-C. For primitives that span multiple tiles, those same primitives may be sent to the next component of the graphics pipeline 100 (and stored) multiple times, where the primitive is sent separately for each tile that it is associated with when the primitives of that tile are processed.

Responsive to determining that the size value of the primitives in 2D image space does not exceed the size threshold, the rendering decision component 125A-C may disable tiling in the tiler 115A-C. The tiler 115A-C, based on tiling being disabled provides the primitives in 2D image space to a next component in the graphics pipeline 100 according to some order that is not based on tiles. In particular, the tiler 115A-C may provide the primitives to a next component of the graphics pipeline 100 without first sorting the primitives (i.e., in a strict order in which the primitives are sent in the draw calls via API calls or in a strict API call order).

In one embodiment, providing the primitives in 2D image space to the next component of the graphics pipeline 100 (e.g., to the frame buffer 150) includes providing the primitives to the raster engine 130A-C and pixel shader 140A-C.

Raster engine 130A-C performs rasterization on the primitives that it receives. Rasterization includes generating discrete fragments from multiple primitives. Each fragment may correspond to a pixel in frame buffer 150, which in turn may correspond to a pixel on a display or screen. Fragments can be colored, textured and/or illuminated in the rasterization process. In the case of overlapping polygons, raster engine 130A-C may determine which polygons are closer to an observer, and thus which polygons should be hidden and which polygons should be shown.

If tiling was enabled, then the raster engine 130A-C receives the primitives in 2D image space in the sorted order dictated by the tiler 115A-C and creates pixels for each of the primitives in 2D image space to populate the frame buffer 150. The created pixels for each of the primitives in 2D image space populating the frame buffer 150 may then maintain the sorted order dictated by the tiler 115A-C.

The pixel shader 140A-C may apply, for each fragment or pixel associated with a primitive in 2D image space, color, brightness, contrast, and/or other characteristics associated with the pixel. The pixel shader 140A-C and/or raster engine 130A-C may populate the frame buffer 150 with the fragments or pixels associated with the primitives in 2D image space.

The frame buffer 150 drives video display of the pixels associated with full primitives and/or partial primitives. If tiled rendering was performed by a tiler 115A-C, then frame buffer 150 may be filled with fragments generated from graphics primitives, tile by tile, where one or more fragments and/or pixels associated with a first tile are sent to frame buffer 150 before fragments and/or pixels associated with a next tile.

Figure 2:
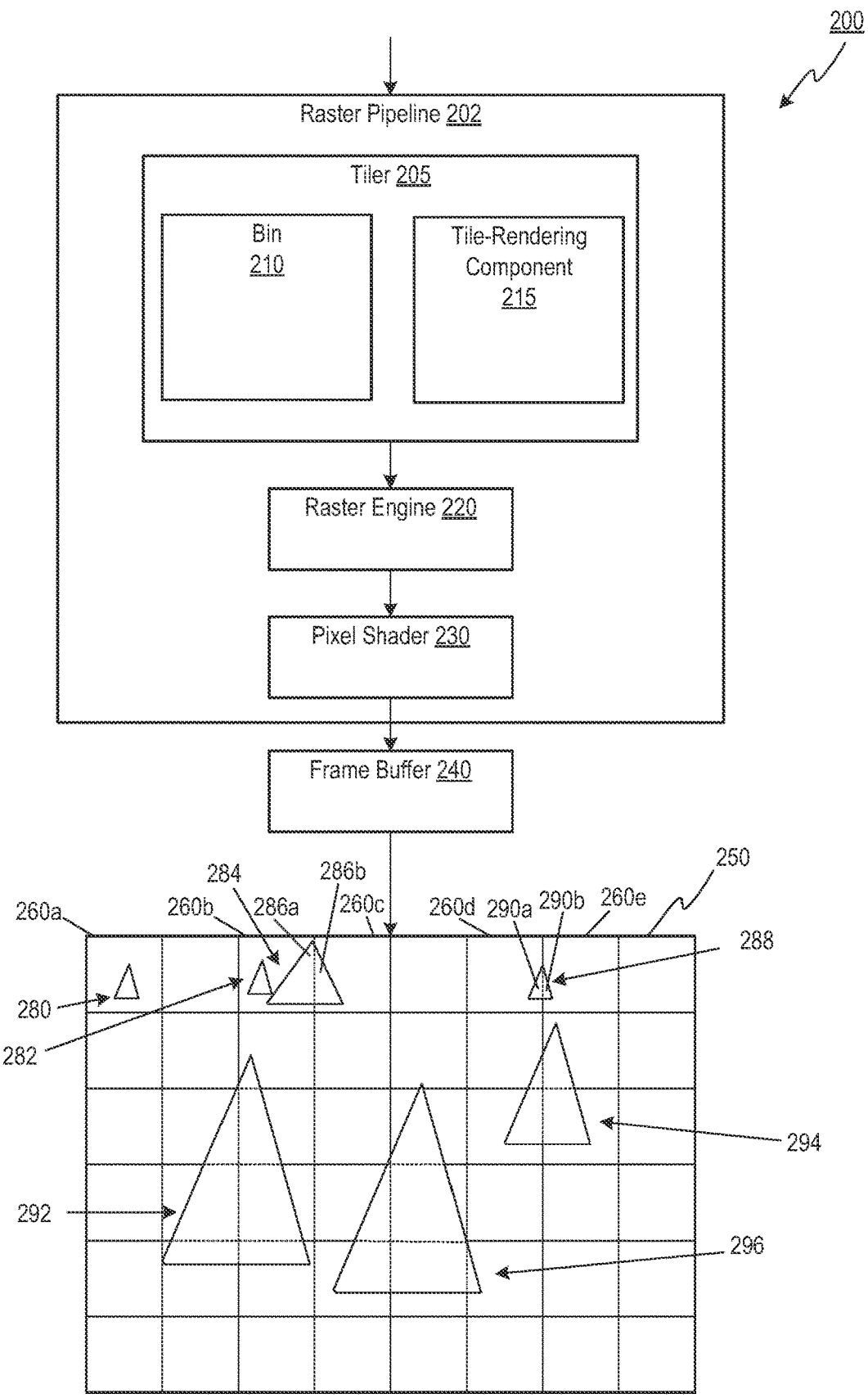
FIG. 2 illustrates an example of enabling tiled rendering of one or more graphics primitives to a frame, in accordance with at least one embodiment.

FIG. 2 illustrates enabling tiled rendering of one or more primitives to a video display in accordance with at least one embodiment. In FIG. 2, a portion of a graphics pipeline 200 includes a raster pipeline 202, a frame buffer 240, and a video display 250. Portion of graphics pipeline 200 is similar to a corresponding portion of the graphics pipeline 100 (FIG. 1). The frame buffer 240 is similar to the frame buffer 150 of FIG. 1. Raster pipeline 202 is similar to a raster pipeline of the one or more raster pipelines 110A-C of FIG. 1. Accordingly, raster pipeline 202 includes a tiler 205, a raster engine 220, and a pixel shader 230. The tiler 205 is similar to the tiler 115 of FIG. 1 and includes a bin 210 and a rendering decision component 215. The rendering decision component 215 is similar to the rendering decision component 125 of FIG. 1.

Raster pipeline 202 receives from one or more geometry pipelines primitives in 2D image space. Raster pipeline 202 sends the primitives (e.g., primitives 280, 282, and 288) in 2D image space to the tiler 205. The tiler 205 stores the primitives in 2D image space to bin 210. Bin 210 may be a memory that receives all the primitives in 2D image space associated with the frame or a portion of the primitives in 2D image space associated with the frame.

If tiled rendering is enabled, the tiler 205 will divide the 2D image space into a grid of tiles (e.g., rectangles) based on a predetermined tile size to render each tile of the grid separately (e.g., each tile corresponds to a grid position of the 2D image space). In embodiments, rendering decision component 215 determines that tiling should be enabled based on the primitives in 2D image space associated with the frame in bin 210. The tile-rendering 215 sorts the primitives in 2D image space, tile by tile. The raster engine 220 receives the primitives in 2D image space in the sorted order dictated by the tiler 205 and creates pixels for each of the primitives in 2D image space. The pixel shader 230 receives, with the sorted order dictated by the tiler 204 maintained, the pixels created by the raster engine 220 for each of the primitives in 2D image space. The pixel shader 230 applies to the pixels for each of the primitives in 2D image space, color, brightness, contrast, and any other characteristics to properly render to the pixels. The frame buffer 240 receives the pixels for each of the primitives in 2D image space, with the sorted order dictated by the tiler 204 maintained to drive the display of the pixels on the video display 250.

As discussed hereinabove, in some embodiments a rendering decision component of a tiler uses sizes of primitives to determine whether or not to enable tiled rendering. To make such assessments, the rendering decision component may compute sizes of one or more primitives and/or one or more statistics on sizes of a set of primitives. Alternatively, sizes of primitives (e.g., of bounding boxes around primitives) may have been previously computed and may be provided to the tiler. For example, such size information for a primitive may be included in metadata associated with the primitive. In one embodiment, each primitive includes or is accompanied by bounding box information indicating the coordinates of a bounding box around the primitive. The coordinates of the bounding box may be represented as a pair of values, where a first coordinate is for an upper left corner of the bounding box and a second coordinate is for a lower right corner of the bounding box (or where a first coordinate is for a lower left corner of the bounding box and a second coordinate is for an upper right corner of the bounding box).

Figure 3A:
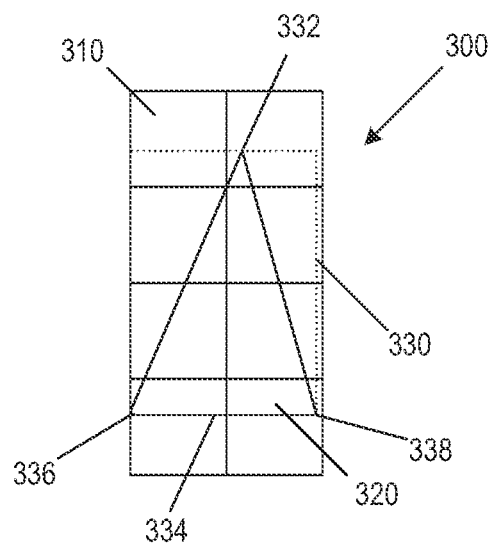
FIGS. 3A and 3B illustrate determining an area of one or more graphics primitives, in accordance with at least one embodiment.

FIG. 3A illustrates techniques for determining an area of one or more primitives in accordance with one embodiment. In an embodiment, the rendering decision component determines the approximate area of a primitive 320 in 2D image space based on a size of a bounding box 330 around the primitive 320. The bounding box 330 is represented by a box that extends from a top most part (e.g., 332) of the primitive 320 to a bottom most part (e.g., 334) of the primitive 320 and extends from a left most part (e.g., 336) of the primitive 320 to a right most part (e.g., 338) of a primitive 320 (i.e., the bounding box extends to a top, a bottom, and sides of the primitive 320). In another embodiment, the rendering decision component may determine a number of tiles 310 within a bounding box 300. Each of the tiles 310 is based on the predetermined tile size dictated by the tiler (e.g., tiler 115 of FIG. 1 or tiler 205 of FIG. 2).

Depending on the embodiment, the bounding box 330 may include full tiles 310 (e.g., tiles that are completely filled by the primitive) and/or partial tiles 310 (e.g., tiles that are partially filled by the primitive). In the illustrated example, each of the tiles 310 is only partially filled by the primitive and its associated bounding box (e.g., bounding box 330). As shown, primitive 320 spans four tiles 310. Accordingly, primitive 320 may be determined to have a size of 4 tiles. In some embodiments, only full tiles may be used to overlay the single primitive 320. In some embodiments, full and/or partial tiles may be used to overlay the single primitive 320. Accordingly, the bounding box 330 is based on how many tiles 310 with the predetermined tile size can fit within the bounding box 330 to fully encompass primitive 320. In one embodiment, the 2D image space including the primitive 320 may be divided into fixed tiles (e.g., tiles 310). Accordingly, to determine an approximate area of the primitive 320 in the 2D image space, the rendering decision component identifies each tile 310 of the 2D image space that overlaps with primitive 320 and draws a bounding box 300 around the tiles 310 of the 2D image space that overlap the single primitive 320. In one embodiment, the number of tiles of the 2D image space that overlaps with primitive 320 is the approximate area of the primitive 320. In one embodiment, the size of the bounding box 300 is divided by the size of the tiles to determine a number of tiles occupied by a primitive.

Depending on the embodiment, the rendering decision component may determine a representative approximate area for a group of primitives based on the approximate area of a representative primitive 320 in 2D image space using a size of the bounding box 300 or 330 associated with primitive 320. Accordingly, the rendering decision component may assign the representative approximate area of the representative primitive to each primitive of the group of primitives associated with the representative primitive. The group of primitives may be grouped together based on similarities in size, shape, location, and/or other characteristics of the primitives. Thus, the rendering decision component may efficiently determine an approximate area for primitives without separately obtaining an approximate area for each individual primitive. The rendering decision component 125 may multiply the approximate area associated with the group of primitives with a number of primitives of the group of primitives to obtain an approximate average area associated with the group of primitives 370.

Figure 3B:
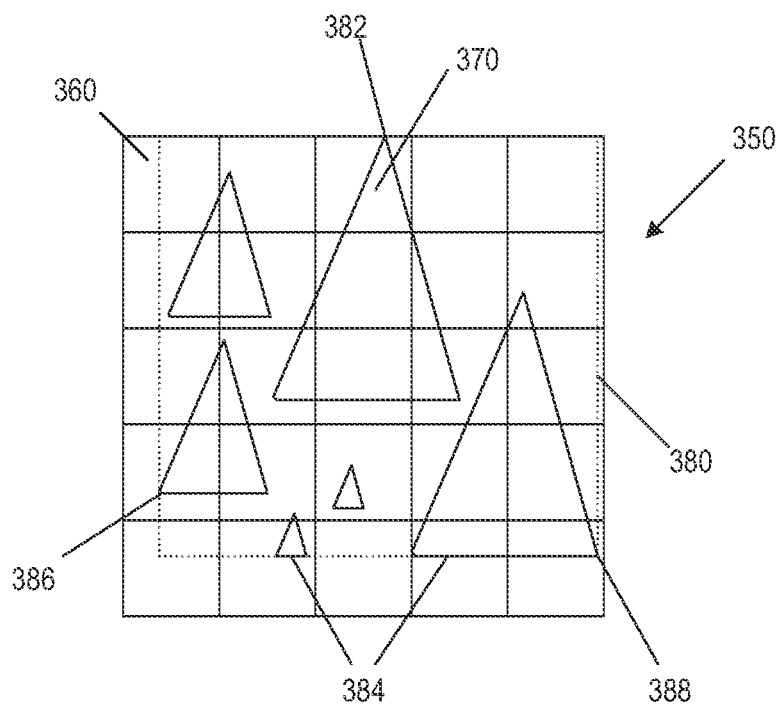

FIG. 3B illustrates techniques for determining an area of a group of primitives 370 in accordance with one embodiment. The group of primitives may include primitives that are proximate to one another and/or that overlap one another in the 2D image space, for example each of the tiles 360, similar to tiles 310, is based on the predetermined tile size dictated by the tiler (e.g., tiler 115 of FIG. 1 or tiler 205 of FIG. 2). In an embodiment, the rendering decision component determines the approximate area of a group of primitives 370 in 2D image space based on a size of a bounding box 380 around the group of primitives 370. The bounding box 380 is represented by a box that extends from a top most part (e.g., 382) of the highest primitive of the groups of primitives 370 to a bottom most part (e.g., 384) of the lowest primitive of the groups of primitives 370 and extends from a left most part (e.g., 386) of the left most primitive of the groups of primitives 370 to a right most part (e.g., 388) of the right most primitive of the groups of primitives 370 (i.e., the bounding box extends to a top of the group of primitives, a bottom of the group of primitives, and to each sides of the group of primitives).

Depending on the embodiment, the bounding box 380 may include full tiles 360 and/or partial tiles 360. In another instance, the tiles 360 may be placed overlaying the grouping of primitives 370 until the grouping of primitives 370 is encompassed, and the bounding box 380 may be generated around the tiles 360. In some embodiments, only full tiles may be used to overlay the grouping of primitives 370. In some embodiments, full and/or partial tiles may be used to overlay the grouping of primitives 370. Accordingly, the bounding box 380 size may be based on how many tiles 360 with the predetermined tile size can fit within the bounding box 380 to fully encompass the group of primitives 370. As described previously, the rendering decision component 125 may interpret the approximate area associated with the group of primitives 370 as an approximate area associated with a single primitive (e.g., similar to primitive 320 of FIG. 3A). That approximate area may be divided by the number of primitives in the group to determine an approximate area per primitive. Alternatively, the approximate area associated with the group of primitives (e.g., group of primitives 370) may be assigned as an approximate area for each primitive within the group of primitives.

In another embodiment, as described previously, the 2D image space including the group of primitives 370 may be divided into fixed tiles (e.g., tiles 360). Accordingly, to determine the approximate area of the group of primitives 370 in 2D image space, the rendering decision component identifies each tile 360 of the 2D image space that overlaps with the group of primitives 370 and draws a bounding box 350 around the tiles 360 of the 2D image space that overlap with the group of primitives 370. In one embodiment, the number of tiles 360 of the 2D image space that overlaps with the group of primitives 370 is the approximate area of the group of primitives 370. In one embodiment, the size of the bounding box 350 is divided by the size of the tiles to determine a number of tiles occupied by the group of primitives 370.

Figure 4:
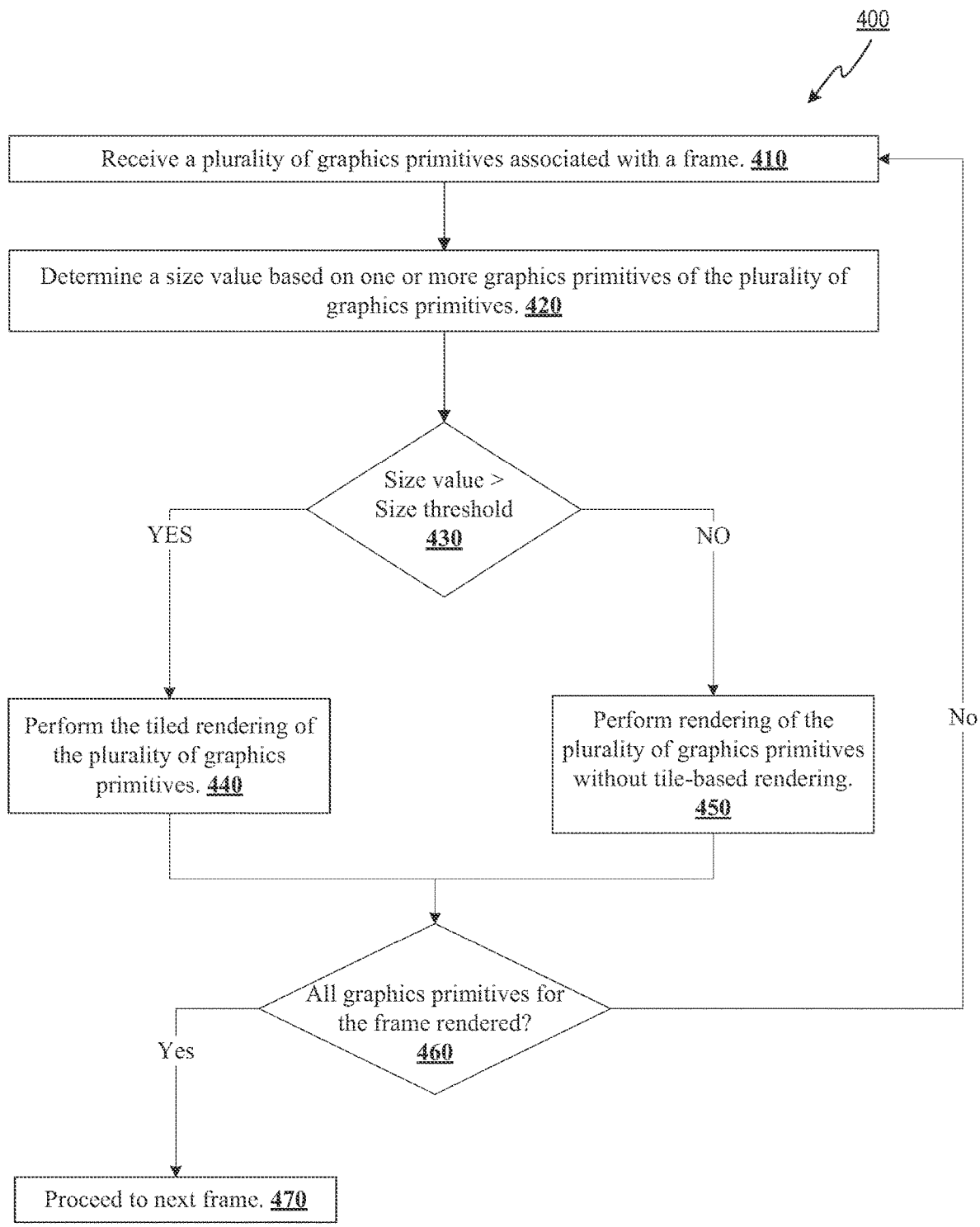
FIG. 4 is a flow diagram of a process of determining whether to enable tiled rendering of one or more graphics primitives to the frame, in accordance with at least one embodiment.

FIG. 4 depicts a flow diagram of an example method 400 for determining whether to enable tiled rendering of one or more primitives to a frame or image in accordance with one or more aspects of the present disclosure. The method may be performed by processing logic that may comprise hardware (circuitry, dedicated logic, etc.), computer readable instructions (run on a general purpose computer system or a dedicated machine), or a combination of both. In an illustrative example, one or more operations of method 300 may be performed by a processor, such as a graphics processing unit (not shown). Alternatively, some or all of the operations of method 400 might be performed by another module or machine. It should be noted that blocks depicted in FIG. 4 could be performed simultaneously or in a different order than that depicted, and may be performed by the same hardware, firmware or software or by different hardware, firmware and/or software.

At block 410, processing logic receives a plurality of graphics primitives associated with a frame. In embodiments, the plurality of graphics primitives are added to a bin or memory, and may fill the bin or memory. The plurality of graphics primitives may be a portion of all of the graphics primitives associated with a frame or image. In some embodiments, the plurality of graphics primitives may be a plurality of triangles. In some embodiments, the frame may be associated with a three-dimensional (3D) scene. As described previously, in some embodiments the graphics primitives refer to at least one primitive in 3D space of a geometry of a 3D scene. The graphics primitives may have been processed such that they are associated with a camera position of the geometry in the 3D space (e.g., are in a camera reference frame).

At block 420, the processing logic determines a size value based on one or more graphics primitives of the plurality of graphics primitives. The one or more graphics primitives may include all of the graphics primitives in the bin, or a subset of the graphics primitives in the bin. For example, a subset of graphics primitives may be used as representative members of the graphics primitives in the bin, and the size value may be determined from the subset of graphics primitives. In some embodiments, the processing device may determine the size value by determining an approximate average area for the plurality of graphics primitives. In embodiments, the processing logic determines the approximate average area for the plurality of graphics primitives by determining a plurality of approximate areas associated with the plurality of graphics primitives.

In one embodiment, for each primitive of the plurality of graphics primitives or of the subset of the plurality of graphics primitives, the processing logic determines an approximate area for the primitive based on a number of tiles within a bounding box that encompasses the primitive. The processing logic may determine, for each such graphics primitive, how many tiles were used to encompass the graphics primitive and/or the bounding box for the graphics primitive. As described previously, to determine the number of tiles within the bounding box that encompasses the primitive, the processing logic, for one or more graphics primitive, may determine a number of tiles having a predetermined tile size that encompass the graphics primitive. In some instances, when the approximate area is determined for set of graphics primitives, the processing logic may multiply the approximate area of a representative of the set of graphics primitives by the number of graphics primitives in the set of graphics primitives to determine a total area for the set. Once the approximate area is determined for each of the graphics primitives, the processing logic may average the plurality of approximate areas to determine the approximate average area for the plurality of graphics primitives. For example, processing logic may determine a sum of the approximate areas of all graphics primitives in the bin and may divide the sum by a total number of graphics primitives in the bin. In some instances, division operations may be costly to perform in hardware. Accordingly, rather than determining an average of the approximate areas of the primitives, processing logic may determine a sum of the approximate areas. The approximate areas, including the approximate average area and sum of approximate areas, may have a unit of pixels, of square inches, of square millimeters, of number of tiles, and so on.

At block 430, the processing logic determines whether the size value (e.g., approximate average area or sum of approximate areas) exceeds a size threshold. In some embodiments, the processing logic determines the size threshold by determining a tile size and multiplying the tile size by a configurable threshold value. Like the approximate areas, the size threshold may have units of pixels, of square inches, of square millimeters, of number of tiles, and so on. Accordingly, the processing logic compares the size value (e.g., the determined approximate average size of the areas of the primitives) to the determined size threshold. In instances where the size value is a sum of approximate areas rather than an average of approximate areas, the tile size is further multiplied by the number of primitives in the bin. By comparing the sum of the approximate areas of the primitives against the tile size, multiplied by the configurable threshold value, multiplied by the number of primitives, a same result can be achieved as by comparing the approximate average areas of the primitives against the tile size multiplied by the configurable threshold value, but without performing any division operations. This can improve an efficiency of the rendering decision component implemented in hardware.

At block 430, responsive to determining that the size value exceeds the size threshold, the method proceeds to block 440 and processing logic performs tiled rendering of the plurality of graphics primitives. In some embodiments, the processing logic performs the tiled rendering of the plurality of graphics primitives by rendering the plurality of graphics primitives to the frame one tile at a time. As described previously, to render the plurality of graphics primitives to the frame tile by tile, the processing logic sorts the plurality of graphics primitives by tiles. Once sorted, the sorted plurality of graphics primitives are rasterized. Rasterization includes creating pixels for each of the sorted plurality of graphics primitives, while maintaining the order of the sorted plurality of graphics primitives. The processing logic applies pixel characteristics to the pixels associated with the sorted plurality of graphics primitives and provides the pixels to the frame buffer for display on a video display.

At block 430, responsive to determining that the size value does not exceed the size threshold, the method proceeds to block 450 and processing logic performs immediate rendering or standard rendering of the plurality of graphics primitives. In some embodiments, the processing logic performs immediate rendering or standard of the plurality of graphics primitives by rendering the plurality of graphics primitives to the frame one graphic primitive at a time, irrespective of which tile that primitive might have been associated with. As described previously, to render the plurality of graphics primitives to the frame one graphic primitive at a time, the processing logic creates pixels for each graphics primitive of the plurality of graphics primitives (e.g., rasterize). The processing logic applies pixel characteristics to the pixels associated with the plurality of graphics primitives and provides the pixels to the frame buffer for display on a video display.

At block 460, the processing logic determines whether all graphics primitives for the frame are rendered. As described previously, all or a portion of the graphics primitives associated with the frame may be processed at any given time. If all the graphics primitives for the frame are rendered, the processing logic, at block 470, proceeds to the next frame and receives a second plurality of graphics primitives associated with a second frame, repeating method 400 for the next frame.

If at block 460 a determination is made that not all primitives for a frame have been rendered, the method returns to block 410 and a next set of primitives is added to a bin. The processing logic, at block 420, determines a second size value to determine whether to enable or disable tiled rendering for the rendering of the second plurality of graphics primitives based on whether the second size value exceeds the size threshold. Accordingly, different primitives within the same frame may be rendered using different rendering techniques.

Figure 5:
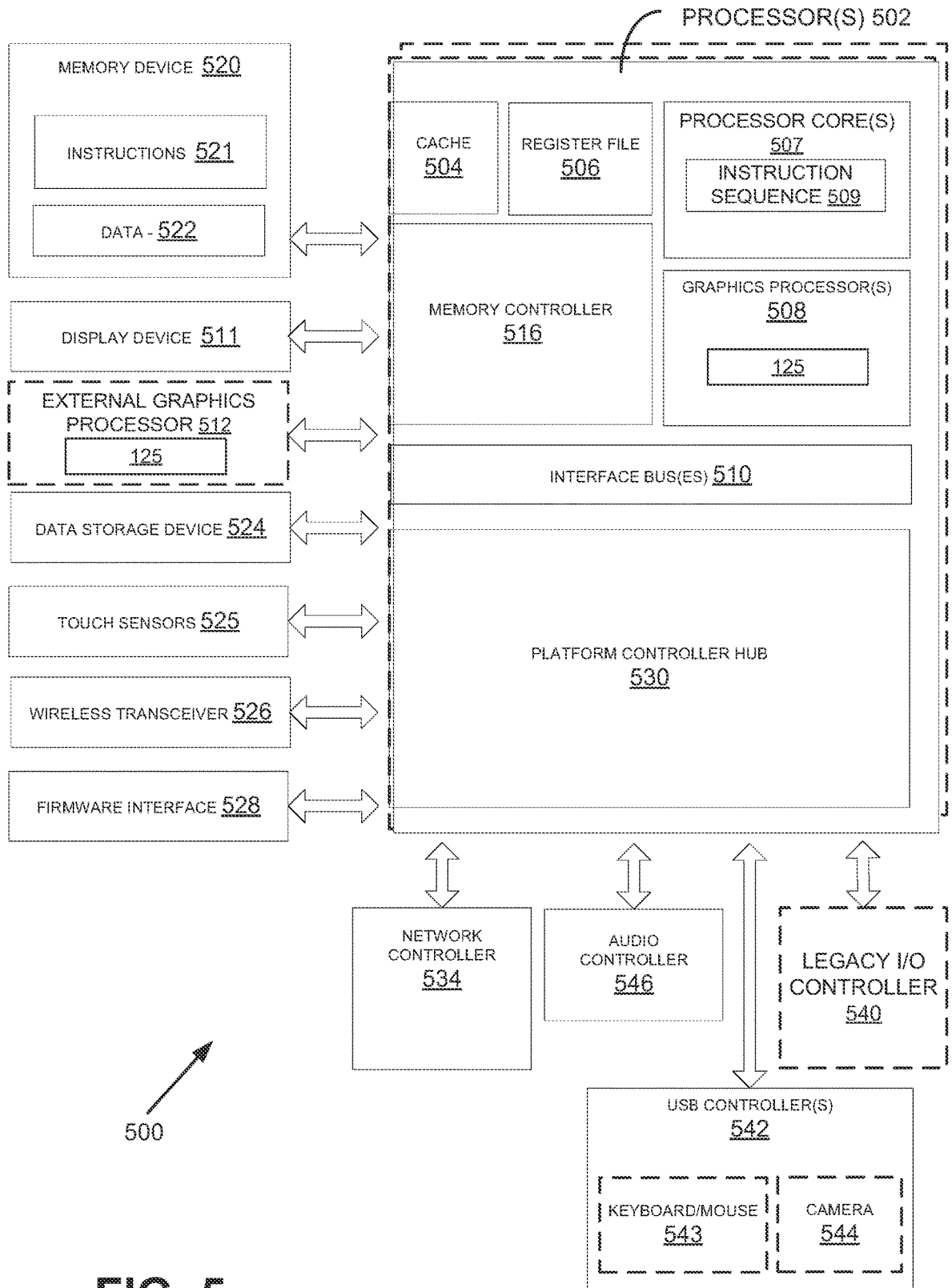
FIG. 5 is a block diagram illustrating a computer system, according to at least one embodiment.

FIG. 5 is a block diagram of a processing system, according to at least one embodiment. In at least one embodiment, system 500 includes one or more processors 502 and one or more graphics processors 508, and may be a single processor desktop system, a multiprocessor workstation system, or a server system having a large number of processors 502 or processor cores 507. In at least one embodiment, system 500 is a processing platform incorporated within a system-on-a-chip (SoC) integrated circuit for use in mobile, handheld, or embedded devices.

In at least one embodiment, system 500 can include, or be incorporated within, a server-based gaming platform, a game console, including a game and media console, a mobile gaming console, a handheld game console, or an online game console. In at least one embodiment, system 500 is a mobile phone, a smart phone, a tablet computing device or a mobile Internet device. In at least one embodiment, processing system 500 can also include, couple with, or be integrated within a wearable device, such as a smart watch wearable device, a smart eyewear device, an augmented reality device, or a virtual reality device. In at least one embodiment, processing system 500 is a television or set top box device having one or more processors 502 and a graphical interface generated by one or more graphics processors 508.

In at least one embodiment, one or more processors 502 each include one or more processor cores 507 to process instructions which, when executed, perform operations for system and user software. In at least one embodiment, each of one or more processor cores 507 is configured to process a specific instruction sequence 509. In at least one embodiment, instruction sequence 509 may facilitate Complex Instruction Set Computing (CISC), Reduced Instruction Set Computing (RISC), or computing via a Very Long Instruction Word (VLIW). In at least one embodiment, processor cores 507 may each process a different instruction sequence 509, which may include instructions to facilitate emulation of other instruction sequences. In at least one embodiment, processor core 507 may also include other processing devices, such a Digital Signal Processor (DSP).

In at least one embodiment, processor 502 includes a cache memory 504. In at least one embodiment, processor 502 can have a single internal cache or multiple levels of internal cache. In at least one embodiment, cache memory is shared among various components of processor 502. In at least one embodiment, processor 502 also uses an external cache (e.g., a Level-3 (L3) cache or Last Level Cache (LLC)) (not shown), which may be shared among processor cores 507 using known cache coherency techniques. In at least one embodiment, a register file 506 is additionally included in processor 502, which may include different types of registers for storing different types of data (e.g., integer registers, floating point registers, status registers, and an instruction pointer register). In at least one embodiment, register file 506 may include general-purpose registers or other registers.

In at least one embodiment, one or more processor(s) 502 are coupled with one or more interface bus(es) 510 to transmit communication signals such as address, data, or control signals between processor 502 and other components in system 500. In at least one embodiment, interface bus 510 can be a processor bus, such as a version of a Direct Media Interface (DMI) bus. In at least one embodiment, interface bus 510 is not limited to a DMI bus, and may include one or more Peripheral Component Interconnect buses (e.g., PCI, PCI Express), memory busses, or other types of interface busses. In at least one embodiment processor(s) 502 include an integrated memory controller 516 and a platform controller hub 530. In at least one embodiment, memory controller 516 facilitates communication between a memory device and other components of system 500, while platform controller hub (PCH) 530 provides connections to I/O devices via a local I/O bus.

In at least one embodiment, a memory device 520 can be a dynamic random access memory (DRAM) device, a static random access memory (SRAM) device, flash memory device, phase-change memory device, or some other memory device having suitable performance to serve as process memory. In at least one embodiment, memory device 520 can operate as system memory for system 500, to store data 522 and instructions 521 for use when one or more processors 502 executes an application or process. In at least one embodiment, memory controller 516 also couples with an optional external graphics processor 512, which may communicate with one or more graphics processors 508 in processors 502 to perform graphics and media operations. In at least one embodiment, a display device 511 can connect to processor(s) 502. In at least one embodiment, display device 511 can include one or more of an internal display device, as in a mobile electronic device or a laptop device, or an external display device attached via a display interface (e.g., DisplayPort, etc.). In at least one embodiment, display device 511 can include a head mounted display (HMD) such as a stereoscopic display device for use in virtual reality (VR) applications or augmented reality (AR) applications.

In at least one embodiment, platform controller hub 530 enables peripherals to connect to memory device 520 and processor 502 via a high-speed I/O bus. In at least one embodiment, I/O peripherals include, but are not limited to, an audio controller 546, a network controller 534, a firmware interface 528, a wireless transceiver 526, touch sensors 525, a data storage device 524 (e.g., hard disk drive, flash memory, etc.). In at least one embodiment, data storage device 524 can connect via a storage interface (e.g., SATA) or via a peripheral bus, such as a Peripheral Component Interconnect bus (e.g., PCI, PCI Express). In at least one embodiment, touch sensors 525 can include touch screen sensors, pressure sensors, or fingerprint sensors. In at least one embodiment, wireless transceiver 526 can be a Wi-Fi transceiver, a Bluetooth transceiver, or a mobile network transceiver such as a 3G, 4G, or Long Term Evolution (LTE) transceiver. In at least one embodiment, firmware interface 528 enables communication with system firmware, and can be, for example, a unified extensible firmware interface (UEFI). In at least one embodiment, network controller 534 can enable a network connection to a wired network. In at least one embodiment, a high-performance network controller (not shown) couples with interface bus 510. In at least one embodiment, audio controller 546 is a multi-channel high definition audio controller. In at least one embodiment, system 500 includes an optional legacy I/O controller 540 for coupling legacy (e.g., Personal System 2 (PS/2)) devices to system 500. In at least one embodiment, platform controller hub 530 can also connect to one or more Universal Serial Bus (USB) controllers 542 connect input devices, such as keyboard and mouse 543 combinations, a camera 544, or other USB input devices.

In at least one embodiment, an instance of memory controller 516 and platform controller hub 530 may be integrated into a discreet external graphics processor, such as external graphics processor 512. In at least one embodiment, platform controller hub 530 and/or memory controller 516 may be external to one or more processor(s) 502. For example, in at least one embodiment, system 500 can include an external memory controller 516 and platform controller hub 530, which may be configured as a memory controller hub and peripheral controller hub within a system chipset that is in communication with processor(s) 502.

In embodiments, external graphics processor 512 may include rendering decision component 125, which may be implemented in hardware in embodiments. Rendering decision component 125 may be used for enabling or disabling tiled rendering based on heuristics and/or rules. Details regarding rendering decision component 125 is provided herein in conjunction with FIGS. 1 through 4. In at least one embodiment, rendering decision component 125 may be used in system 500 for enabling or disabling tiled rendering based on heuristics as described herein.

Figure 6:
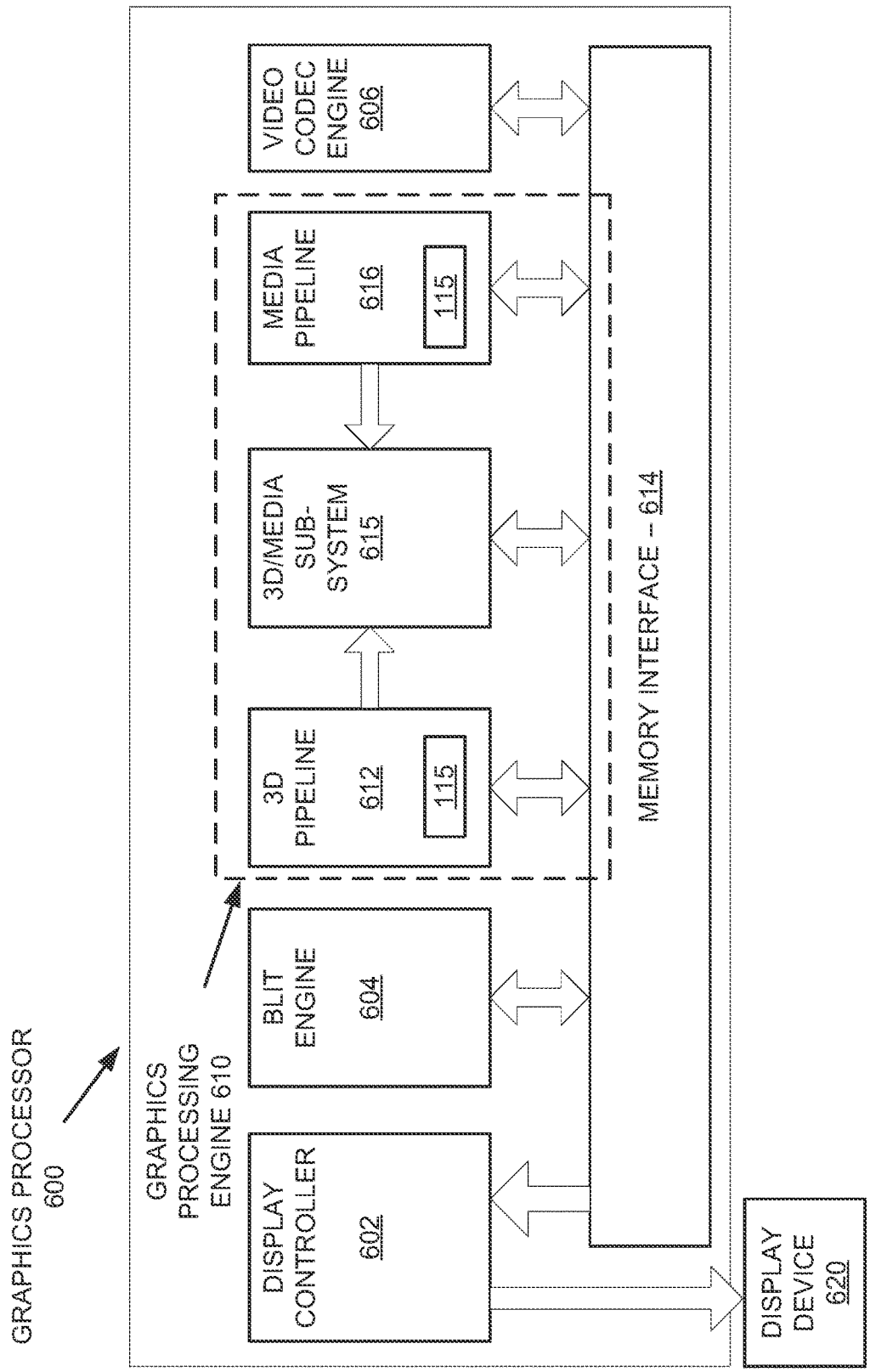
FIG. 6 illustrates at least portions of a graphics processor, according to one or more embodiments.

FIG. 6 is a block diagram of a graphics processor 600, which may be a discrete graphics processing unit, or may be a graphics processor integrated with a plurality of processing cores. In at least one embodiment, graphics processor 600 communicates via a memory mapped I/O interface to registers on graphics processor 600 and with commands placed into memory. In at least one embodiment, graphics processor 600 includes a memory interface 614 to access memory. In at least one embodiment, memory interface 614 is an interface to local memory, one or more internal caches, one or more shared external caches, and/or to system memory.

In at least one embodiment, graphics processor 600 also includes a display controller 602 to drive display of output data to a display device 620. In at least one embodiment, display controller 602 includes hardware for one or more overlay planes for display device 620 and composition of multiple layers of video or user interface elements. In at least one embodiment, display device 620 can be an internal or external display device. In at least one embodiment, display device 620 is a head mounted display device, such as a virtual reality (VR) display device or an augmented reality (AR) display device. In at least one embodiment, display device is or includes a monitor. In at least one embodiment, graphics processor 600 includes a video codec engine 606 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In at least one embodiment, graphics processor 600 includes a block image transfer (BLIT) engine 604 to perform two-dimensional (2D) rasterizer operations including, for example, bit-boundary block transfers. However, in at least one embodiment, 2D graphics operations are performed using one or more components of a graphics processing engine (GPE) 610. In at least one embodiment, GPE 610 is a compute engine for performing graphics operations, including three-dimensional (3D) graphics operations and media operations.

In at least one embodiment, GPE 610 includes a 3D pipeline 612 for performing 3D operations, such as rendering three-dimensional images and scenes using processing functions that act upon 3D primitive shapes (e.g., rectangle, triangle, etc.). In at least one embodiment, 3D pipeline 612 includes programmable and fixed function elements that perform various tasks and/or spawn execution threads to a 3D/Media sub-system 615. While 3D pipeline 612 can be used to perform media operations, in at least one embodiment, GPE 610 also includes a media pipeline 616 that is used to perform media operations, such as video post-processing and image enhancement.

In at least one embodiment, media pipeline 616 includes fixed function or programmable logic units to perform one or more specialized media operations, such as video decode acceleration, video de-interlacing, and video encode acceleration in place of, or on behalf of, video codec engine 606. In at least one embodiment, media pipeline 616 additionally includes a thread spawning unit to spawn threads for execution on 3D/Media sub-system 615. In at least one embodiment, spawned threads perform computations for media operations on one or more graphics execution units included in 3D/Media sub-system 615.

In at least one embodiment, 3D/Media subsystem 615 includes logic for executing threads spawned by 3D pipeline 612 and media pipeline 616. In at least one embodiment, 3D pipeline 612 and media pipeline 616 send thread execution requests to 3D/Media subsystem 615, which includes thread dispatch logic for arbitrating and dispatching various requests to available thread execution resources. In at least one embodiment, execution resources include an array of graphics execution units to process 3D and media threads. In at least one embodiment, 3D/Media subsystem 615 includes one or more internal caches for thread instructions and data. In at least one embodiment, subsystem 615 also includes shared memory, including registers and addressable memory, to share data between threads and to store output data.

In embodiments, 3D pipeline 612 and/or media pipeline 616 may include a tiler 115 (e.g., tiler 115A-C), which includes a rendering decision component (e.g., rendering decision component 125A-C) used to decide whether to enable or disable tiled rendering, in accordance with one or more embodiments. Details regarding tiler 115 and/or rendering decision component are provided herein in conjunction with FIG. 1. In at least one embodiment portions or all of tiler 115 and/or rendering decision component may be incorporated into graphics processor 600. For example, in at least one embodiment, tiler 115 and/or rendering decision component techniques described herein may use one or more of ALUs embodied in 3D pipeline 612 and/or media pipeline 616. Moreover, in at least one embodiment, tiler and/or rendering decision component described herein may be done using logic other than logic illustrated in FIG. 1.

Figure 7:
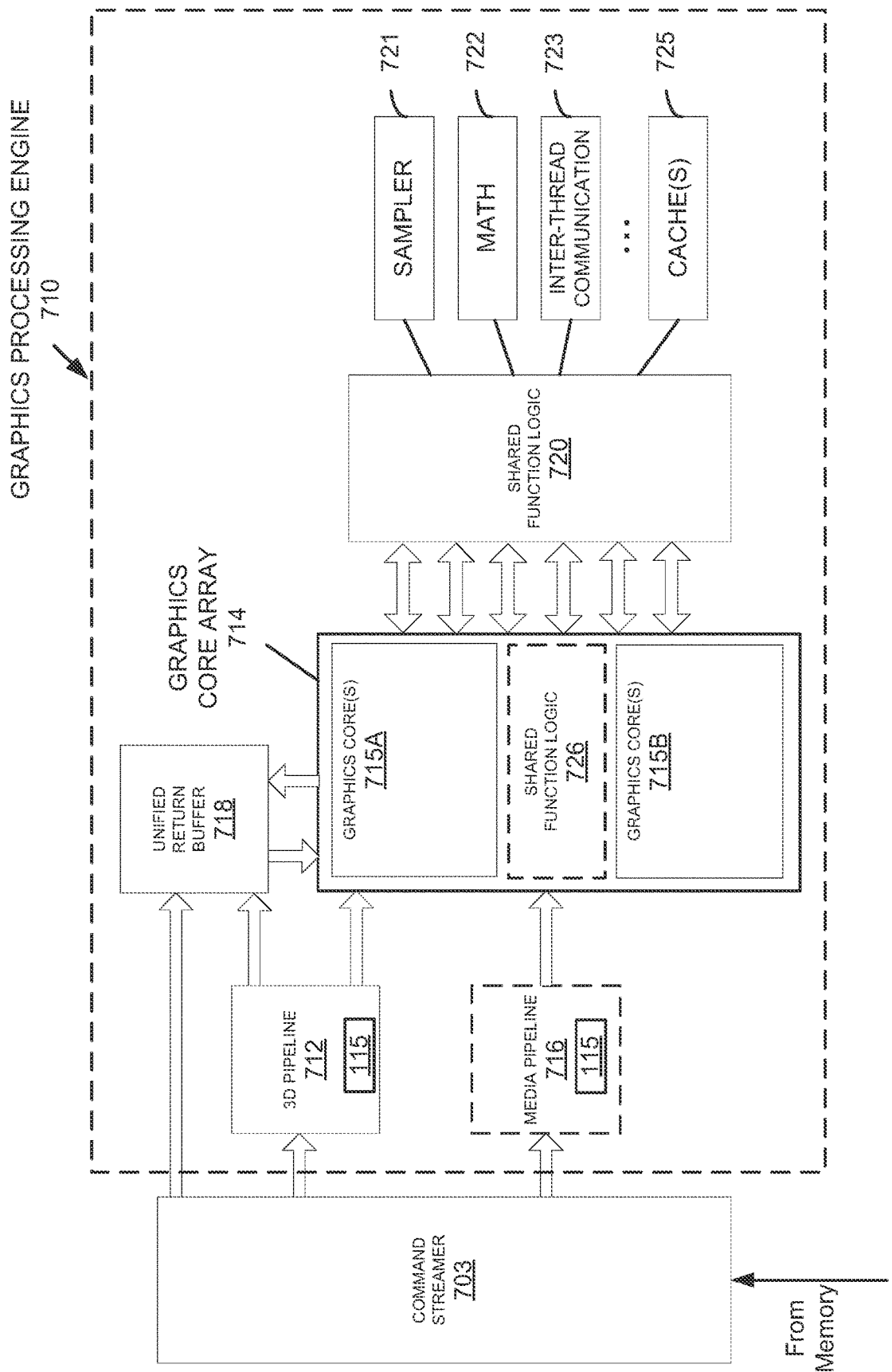
FIG. 7 is a block diagram of a graphics processing engine of a graphics processor in accordance with at least one embodiment.

FIG. 7 is a block diagram of a graphics processing engine 710 of a graphics processor in accordance with at least one embodiment. In at least one embodiment, graphics processing engine (GPE) 710 is a version of GPE 610 shown in FIG. 6. In at least one embodiment, a media pipeline 716 is optional and may not be explicitly included within GPE 710. In at least one embodiment, a separate media and/or image processor is coupled to GPE 710.

In at least one embodiment, GPE 710 is coupled to or includes a command streamer 703, which provides a command stream to a 3D pipeline 712 and/or media pipeline 716. In at least one embodiment, command streamer 703 is coupled to memory, which can be system memory, or one or more of internal cache memory and shared cache memory. In at least one embodiment, command streamer 703 receives commands from memory and sends commands to 3D pipeline 712 and/or media pipeline 716. In at least one embodiment, commands are instructions, primitives, or micro-operations fetched from a ring buffer, which stores commands for 3D pipeline 712 and media pipeline 716. In at least one embodiment, a ring buffer can additionally include batch command buffers storing batches of multiple commands. In at least one embodiment, commands for 3D pipeline 712 can also include references to data stored in memory, such as, but not limited to, vertex and geometry data for 3D pipeline 712 and/or image data and memory objects for media pipeline 716. In at least one embodiment, 3D pipeline 712 and media pipeline 716 process commands and data by performing operations or by dispatching one or more execution threads to a graphics core array 714. In at least one embodiment, graphics core array 714 includes one or more blocks of graphics cores (e.g., graphics core(s) 715A, graphics core(s) 715B), each block including one or more graphics cores.

In at least one embodiment, 3D pipeline 712 includes fixed function and programmable logic to process one or more shader programs, such as vertex shaders, geometry shaders, pixel shaders, fragment shaders, compute shaders, or other shader programs, by processing instructions and dispatching execution threads to graphics core array 714. In at least one embodiment, graphics core array 714 provides a unified block of execution resources for use in processing shader programs. In at least one embodiment, a multi-purpose execution logic (e.g., execution units) within graphics core(s) 715A-2915B of graphic core array 714 includes support for various 3D API shader languages and can execute multiple simultaneous execution threads associated with multiple shaders.

In at least one embodiment, graphics core array 714 also includes execution logic to perform media functions, such as video and/or image processing. In at least one embodiment, execution units additionally include general-purpose logic that is programmable to perform parallel general-purpose computational operations, in addition to graphics processing operations.

In at least one embodiment, output data generated by threads executing on graphics core array 714 can output data to memory in a unified return buffer (URB) 718. In at least one embodiment, URB 718 can store data for multiple threads. In at least one embodiment, URB 718 may be used to send data between different threads executing on graphics core array 714. In at least one embodiment, URB 718 may additionally be used for synchronization between threads on graphics core array 714 and fixed function logic within shared function logic 720.

In at least one embodiment, graphics core array 714 is scalable, such that graphics core array 714 includes a variable number of graphics cores, each having a variable number of execution units based on a target power and performance level of GPE 710. In at least one embodiment, execution resources are dynamically scalable, such that execution resources may be enabled or disabled as needed.

In at least one embodiment, graphics core array 714 is coupled to shared function logic 720 that includes multiple resources that are shared between graphics cores in graphics core array 714. In at least one embodiment, shared functions performed by shared function logic 720 are embodied in hardware logic units that provide specialized supplemental functionality to graphics core array 714. In at least one embodiment, shared function logic 720 includes but is not limited to a sampler unit 721, a math unit 722, and inter-thread communication (ITC) logic 729. In at least one embodiment, one or more cache(s) 725 are included in, or coupled to, shared function logic 720.

In at least one embodiment, a shared function is used if demand for a specialized function is insufficient for inclusion within graphics core array 714. In at least one embodiment, a single instantiation of a specialized function is used in shared function logic 720 and shared among other execution resources within graphics core array 714. In at least one embodiment, specific shared functions within shared function logic 720 that are used extensively by graphics core array 714 may be included within shared function logic 720 within graphics core array 714. In at least one embodiment, shared function logic 720 within graphics core array 714 can include some or all logic within shared function logic 720. In at least one embodiment, all logic elements within shared function logic 720 may be duplicated within shared function logic 726 of graphics core array 714. In at least one embodiment, shared function logic 720 is excluded in favor of shared function logic 726 within graphics core array 714.

In embodiments, 3D pipeline 712 and/or media pipeline 716 may include a tiler 115 (e.g., tiler 115A-C), which includes a rendering decision component (e.g., rendering decision component 125A-C) used to decide whether to enable or disable tiled rendering, in accordance with one or more embodiments. Details regarding tiler 115 and/or rendering decision component are provided herein in conjunction with FIG. 1. In at least one embodiment portions or all of tiler 115 and/or rendering decision component may be incorporated into graphics processing engine 710. For example, in at least one embodiment, tiler 115 and/or rendering decision component techniques described herein may use one or more of ALUs embodied in 3D pipeline 712 and/or media pipeline 716. Moreover, in at least one embodiment, tiler and/or rendering decision component described herein may be done using logic other than logic illustrated in FIG. 1.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singularly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example implementations of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method of rendering image data, comprising:
    receiving a plurality of graphics primitives associated with a frame;
    determining a size value based on one or more graphics primitives of the plurality of graphics primitives;
    determining whether the size value exceeds a size threshold, wherein the size threshold is based on multiplying a tile size by at least one of a configurable threshold value or a number of graphics primitives in the plurality of graphics primitives, and wherein the tile size is used to subdivide the frame into a grid of tiles; and
    determining whether to enable or disable tiled rendering for rendering of the plurality of graphics primitives based on whether the size value exceeds the size threshold.

2. The method of claim 1, wherein
    determining the size value comprises determining an approximate average area or approximate sum of areas for the plurality of graphics primitives.

3. The method of claim 2, wherein determining whether the size value exceeds the size threshold comprises:
    determining a tile size;
    determining the size threshold; and
    comparing the size value to the determined size threshold.

4. The method of claim 2, wherein the size threshold is a configurable threshold value, and wherein determining whether the size value exceeds the size threshold comprises:
    comparing the size value with the size threshold.

5. The method of claim 2, wherein determining the approximate average area or the approximate sum of areas for the plurality of graphics primitives comprises:
    determining a plurality of approximate areas associated with the plurality of graphics primitives, wherein for each graphics primitive of the one or more graphics primitives an approximate area for the graphics primitive is determined based on a number of tiles within a bounding box that encompasses the graphics primitive.

6. The method of claim 2, wherein determining the approximate average area or the approximate sum of areas for the plurality of graphics primitives comprises:
    determining a plurality of approximate areas associated with the plurality of graphics primitives, wherein for each graphics primitive of the one or more graphics primitives an approximate area for the graphics primitive is determined based on a number of tiles that overlap the graphics primitive.

7. The method of claim 1, further comprising:
    determining that the size value exceeds the size threshold; and
    performing the tiled rendering of the plurality of graphics primitives, wherein performing the tiled rendering comprises:
        rendering the plurality of graphics primitives to the frame one tile at a time.

8. The method of claim 1, further comprising:
    determining that the size value is below the size threshold; and
    performing rendering of the plurality of graphics primitives with tiled rendering disabled, wherein performing rendering of the plurality of graphics primitives comprises:
        rendering the plurality of graphics primitives to the frame one graphic primitive at a time in an order the plurality of graphics primitives are presented by an application associated with the frame.

9. The method of claim 1, wherein the plurality of graphics primitives comprise a plurality of triangles, and wherein the frame is associated with a three-dimensional (3D) scene.

10. The method of claim 1, further comprising:
    receiving a second plurality of graphics primitives associated with the frame or a second frame;
    determining a second size value based on the second plurality of graphics primitives;
    determining whether the second size value exceeds the size threshold; and
    determining whether to enable or disable tiled rendering for rendering of the second plurality of graphics primitives based on whether the second size value exceeds the size threshold.

11. A system comprising:
    a memory device; and
    a processing device coupled to the memory device, wherein the processing device is to perform operations comprising:
        receiving a plurality of graphics primitives associated with a frame;
        determining a size value based on one or more graphics primitives of the plurality of graphics primitives;
        determining whether the size value exceeds a size threshold, wherein the size threshold is based on multiplying a tile size by at least one of a configurable threshold value or a number of graphics primitives in the plurality of graphics primitives, and wherein the tile size is used to subdivide the frame into a grid of tiles; and
        determining whether to enable or disable tiled rendering for rendering of the plurality of graphics primitives based on whether the size value exceeds the size threshold.

12. The system of claim 11, wherein
    determining the size value comprises determining an approximate average area or approximate sum of areas for the plurality of graphics primitives.

13. The system of claim 12, wherein determining whether the size value exceeds the size threshold comprises:
    determining a tile size;
    determining the size threshold; and
    comparing the size value to the determined size threshold.

14. The system of claim 12, wherein the size threshold is a configurable threshold value, and wherein determining whether the size value exceeds the size threshold comprises: comparing the size value with the size threshold.

15. The system of claim 12, wherein determining the approximate average area or the approximate sum of areas for the plurality of graphics primitives comprises:
  determining a plurality of approximate areas associated with the plurality of graphics primitives, wherein for each graphics primitive of the one or more graphics primitives an approximate area for the graphics primitive is determined based on a number of tiles within a bounding box that encompasses the graphics primitive.

16. The system of claim 12, wherein determining the approximate average area or the approximate sum of areas for the plurality of graphics primitives comprises:
  determining a plurality of approximate areas associated with the plurality of graphics primitives, wherein for each graphics primitive of the one or more graphics primitives an approximate area for the graphics primitive is determined based on a number of tiles that overlap the graphics primitive.

17. The system of claim 11, wherein the processing device is to perform further operations comprising:
  determining that the size value exceeds the size threshold; and
  performing the tiled rendering of the plurality of graphics primitives, wherein performing the tiled rendering comprises:
    rendering the plurality of graphics primitives to the frame one tile at a time.

18. The system of claim 11, wherein the processing device is to perform further operations comprising:
  determining that the size value is below the size threshold; and
  performing rendering of the plurality of graphics primitives with tiled rendering disabled, wherein performing rendering of the plurality of graphics primitives comprises:
    rendering the plurality of graphics primitives to the frame one graphic primitive at a time in an order the plurality of graphics primitives are presented by an application associated with the frame.

19. The system of claim 11, wherein the plurality of graphics primitives comprise a plurality of triangles, and wherein the frame is associated with a three-dimensional (3D) scene.

20. The system of claim 11, wherein the processing device is to perform further operations comprising:
  receiving a second plurality of graphics primitives associated with the frame or a second frame;
  determining a second size value based on the second plurality of graphics primitives;
  determining whether the second size value exceeds the size threshold; and
  determining whether to enable or disable tiled rendering for rendering of the second plurality of graphics primitives based on whether the second size value exceeds the size threshold.

21. A non-transitory computer-readable medium comprising instructions that, responsive to execution by a processing device, cause the processing device to perform operations comprising:
  receiving a plurality of graphics primitives associated with a frame;
  determining a size value based on one or more graphics primitives of the plurality of graphics primitives;
  determining whether the size value exceeds a size threshold, wherein the size threshold is based on multiplying a tile size by at least one of a configurable threshold value or a number of graphics primitives in the plurality of graphics primitives, and wherein the tile size is used to subdivide the frame into used to render each tile of a grid of tiles; and
  determining whether to enable or disable tiled rendering for rendering of the plurality of graphics primitives based on whether the size value exceeds the size threshold.

22. The non-transitory computer-readable medium of claim 21, further causing the processing device to perform operations comprising:
  determining that the size value exceeds the size threshold; and
  performing the tiled rendering of the plurality of graphics primitives, wherein performing the tiled rendering comprises:
    dividing the frame into a plurality of tiles; and
    rendering the plurality of graphics primitives to the frame one tile at a time.

23. The non-transitory computer-readable medium of claim 21, further causing the processing device to perform operations comprising:
  determining that the size value is below the size threshold; and
  performing rendering of the plurality of graphics primitives with tiled rendering disabled, wherein performing rendering of the plurality of graphics primitives comprises:
    rendering the plurality of graphics primitives to the frame one graphic primitive at a time.

24. The non-transitory computer-readable medium of claim 21, further causing the processing device to perform operations comprising:
  receiving a second plurality of graphics primitives associated with the frame or a second frame;
  determining a second size value based on the second plurality of graphics primitives;
  determining whether the second size value exceeds the size threshold; and
  determining whether to enable or disable tiled rendering for rendering of the second plurality of graphics primitives based on whether the second size value exceeds the size threshold.

* * * * *